United States Patent
Ha

(10) Patent No.: US 9,430,867 B2
(45) Date of Patent: Aug. 30, 2016

(54) IMAGE PROCESSING APPARATUS AND METHOD UTILIZING A LOOKUP TABLE AND SPHERICAL HARMONIC COEFFICIENTS

(71) Applicant: SAMSUNG ELECTRONICS CO., LTD., Suwon (KR)

(72) Inventor: In Woo Ha, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 274 days.

(21) Appl. No.: 14/085,222

(22) Filed: Nov. 20, 2013

(65) Prior Publication Data

US 2014/0218365 A1 Aug. 7, 2014

(30) Foreign Application Priority Data

Feb. 1, 2013 (KR) ......................... 10-2013-0011761

(51) Int. Cl.
*G06T 15/50* (2011.01)
*G06T 15/40* (2011.01)

(52) U.S. Cl.
CPC ............. *G06T 15/506* (2013.01); *G06T 15/40* (2013.01)

(58) Field of Classification Search
None
See application file for complete search history.

(56) References Cited

U.S. PATENT DOCUMENTS

| | | |
|---|---|---|
| 2004/0061700 A1 | 4/2004 | Shioya |
| 2005/0041023 A1 | 2/2005 | Green |
| 2006/0214931 A1 | 9/2006 | Snyder et al. |
| 2008/0143719 A1 | 6/2008 | Zhou et al. |
| 2009/0102843 A1 | 4/2009 | Sloan et al. |
| 2010/0156905 A1 | 6/2010 | Aristarkhov |
| 2011/0012901 A1* | 1/2011 | Kaplanyan ............. G06T 15/55 345/426 |

FOREIGN PATENT DOCUMENTS

| | | |
|---|---|---|
| KR | 10-2006-0070174 | 6/2006 |
| KR | 10-0932830 | 12/2009 |
| KR | 10-2012-0004227 | 1/2012 |

OTHER PUBLICATIONS

Zhou, Kun, et al. "Precomputed shadow fields for dynamic scenes." ACM Transactions on Graphics (TOG) 24.3 (2005): 1196-1201.*
Forsyth, Tom. "Spherical Harmonics in Actual Games", Game Developers Conference Europe 2003.*
P. Sloan et al., "Precomputed Radiance Transfer for Real-Time Rendering in Dynamic, Low-Frequency Lighting Environments," *ACM Transactions on Graphics* (*Proceedings of the 29th Annual Conference on Computer Graphics and Interactive Techniques (SIGGRAPH)*), 2002, 10 pages.

* cited by examiner

*Primary Examiner* — Daniel Hajnik
(74) *Attorney, Agent, or Firm* — NSIP Law

(57) ABSTRACT

An image processing apparatus may include a storage unit to store a lookup table (LUT) including information on corresponding relations between an occlusion vector related to at least one point of a 3-dimensional (3D) object and a spherical harmonics (SH) coefficient; and a rendering unit to determine a first SH coefficient corresponding to a first occlusion vector related to a first point of the 3D object using the LUT and to determine a pixel value of the first point using the first SH coefficient.

23 Claims, 13 Drawing Sheets

IMAGE PROCESSING APPARATUS AND METHOD UTILIZING A LOOKUP TABLE AND SPHERICAL HARMONIC COEFFICIENTS

CROSS-REFERENCE TO RELATED APPLICATIONS

This application claims the priority benefit of Korean Patent Application No. 10-2013-0011761, filed on Feb. 1, 2013, in the Korean Intellectual Property Office, the disclosure of which is incorporated herein by reference.

BACKGROUND

1. Field

Example embodiments of the following disclosure relate to an image processing apparatus and method, and more particularly, to an apparatus and method for rendering an image in a spherical harmonics (SH)-based lighting environment.

2. Description of the Related Art

Generally, a spherical harmonics (SH) basis refers to a small number of parameters per frequency band, capable of expressing intensity of all directions. Further, SH may refer to functions that are defined on a sphere. As such, the SH basis is widely applied in various fields including physics, for example. In the field of image processing, the SH basis is applicable even to rendering based on an environment map defined in all directions and may also be used for rendering of a diffuse surface.

Different from lighting or material which are globally defined, visibility information is defined for every surface point. Therefore, since data quantity of the visibility information is great, it is more efficient to read out a stored value through pre-computation in real time rather than computing the information in real time. Accordingly, this method is difficult to be directly applied to dynamic geometry incapable of pre-computation.

Conventionally, the SH based accesses have been already suggested. However, lighting environments have not been considered properly. Also, it is difficult to consider a difference in intensity of every direction with respect to a lighting environment map.

SUMMARY

The foregoing and/or other aspects are achieved by providing an image processing apparatus including a storage unit to store a lookup table (LUT) including information on corresponding relations between an occlusion vector related to at least one point of a 3-dimensional (3D) object and a spherical harmonics (SH) coefficient, and a rendering unit to determine a first SH coefficient using the LUT and to determine a pixel value of the first point using the first SH coefficient.

The first SH coefficient may correspond to a first occlusion vector related to a first point of the 3D object.

The rendering unit may compute the first occlusion vector by sampling an occlusion map related to the first point.

The rendering unit may compute the first occlusion vector by computing occlusion angles related to direction in a number related to the sampling with respect to the first point, using a depth image and a normal image related to the first point.

The image processing apparatus may further include a computation unit to generate the LUT by performing pre-computation that projects the occlusion vector of the at least one point to the at least one predetermined SH basis.

The computation unit may include an occlusion vector computation unit to compute an occlusion vector of the at least one point using a Z-buffer value and a normal vector of the at least one point, an occlusion map generation unit to generate an occlusion map of the at least one point by reflecting a bidirectional reflectance distribution function (BRDF) related to the at least one point, an SH coefficient computation unit to compute an SH coefficient corresponding to the occlusion map by projecting the occlusion map to the at least one SH basis, and an LUT update unit to update the LUT by reflecting information on corresponding relations between the occlusion vector and the SH coefficient to the LUT.

The rendering unit may compute a second SH coefficient by projecting a lighting environment related to the first point to at least one predetermined SH basis, and determines the pixel value of the first point by performing dot product of the first SH coefficient and the second SH coefficient.

The foregoing and/or other aspects are also achieved by providing an image processing apparatus including an occlusion vector computation unit to compute an occlusion vector of at least one point included in a 3-dimensional (3D) object, using a Z-buffer value and a normal vector of the at least one point, an occlusion map generation unit to generate an occlusion map of the at least one point by reflecting a bidirectional reflectance distribution function (BRDF) related to the at least one point, a spherical harmonics (SH) coefficient computation unit to compute an SH coefficient corresponding to the at least one occlusion map by projecting the occlusion map to at least one predetermined SH basis, and a lookup table (LUT) update unit to update the LUT by reflecting information on corresponding relations between the at least one occlusion vector and the at least one SH coefficient to the LUT.

The foregoing and/or other aspects are achieved by providing an image processing method including computing a first occlusion vector related to a first point to be rendered, determining a first spherical harmonics (SH) coefficient corresponding to the first occlusion vector using a lookup table (LUT), and rendering a pixel vale of the first point using the first SH coefficient.

The computing of the first occlusion vector may include generating an occlusion map using a depth image and a normal image related to the first point, and computing the first occlusion vector by sampling the occlusion map.

The computing of the first occlusion vector may include computing occlusion angles related to directions in a number related to the sampling with respect to the first point, and determining of the occlusion angles as elements of the first occlusion vector.

The rendering may include computing a second SH coefficient by projecting a lighting environment related to the first point to at least one predetermined SH basis, and determining the pixel value of the first point by performing dot product of the first SH coefficient and the second SH coefficient.

The image processing method may further include generating the LUT by performing pre-computation that projects the occlusion vector of the at least one point including the first point to the at least one SH basis.

The generating of the LUT may include computing an occlusion vector of at least one point using a Z-buffer value and a normal vector of the at least one point, generating an occlusion map of the at least one point by reflecting a bidirectional reflectance distribution function (BRDF)

related to the at least one point, computing a spherical harmonics (SH) coefficient corresponding to the at least one occlusion map by projecting the occlusion map to at least one predetermined SH basis, and updating the LUT by reflecting information on corresponding relations between the occlusion vector and the SH coefficient to the LUT.

The foregoing and/or other aspects are also achieved by providing an image processing method computing an occlusion vector of at least one point included in a 3-dimensional (3D) object, using a Z-buffer value and a normal vector of the at least one point, generating an occlusion map of the at least one point by reflecting a bidirectional reflectance distribution function (BRDF) related to the at least one point, computing a spherical harmonics (SH) coefficient corresponding to the at least one occlusion map by projecting the occlusion map to at least one predetermined SH basis, and updating the LUT by reflecting information on corresponding relations between the at least one occlusion vector and the at least one SH coefficient to the LUT.

The foregoing and/or other aspects are also achieved by providing an image processing apparatus, including: a computation unit to generate an LUT by computing at least one occlusion vector and SH coefficients; a storage unit to store the LUT including information relating to the at least one occlusion vector and the SH coefficients; and a rendering unit to derive a first SH coefficient using the LUT, thereby performing real-time rendering.

The computation unit may compute the at least one occlusion vector using a Z-buffer value and a normal vector of at least one point of a 3D object, and may compute the SH coefficients by projecting an occlusion map generated by reflecting a BRDF related to the at least one point, to at least one SH basis.

The rendering unit may determine a first SH coefficient corresponding to a first occlusion vector related to a first point of the 3D object using the LUT, and may determine a pixel value of the first point using the first SH coefficient.

According to example embodiments, the rendering unit of the image processing apparatus may quickly derive the SH coefficient using the LUT, thereby performing real-time rendering.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
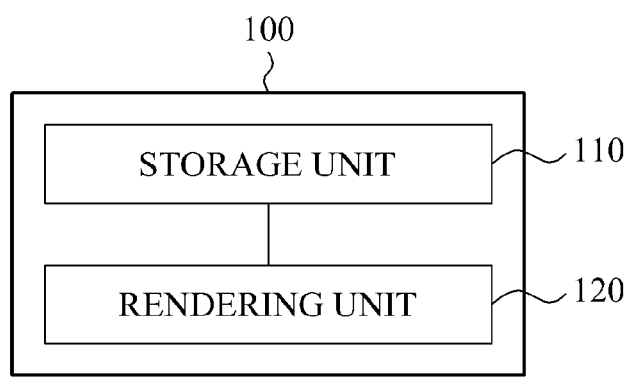
FIG. 1 illustrates a block diagram of an image processing apparatus, according to example embodiments.

Reference will now be made in detail to example embodiments, examples of which are illustrated in the accompanying drawings, wherein like reference numerals refer to the like elements throughout.

Terms to be used below are selected as general terms based on their functions in the present disclosure and may vary according to users, user's intentions, or practices.

But, in specific cases, terms arbitrarily selected by the applicant are also used for easy understanding and explanation and, in this case, meanings of the terms will be mentioned in corresponding detailed description section, so the present disclosure should be understood not by lexical meanings of the terms but by given meanings of the terms.

FIG. 1 illustrates a block diagram of an image processing apparatus 100, according to example embodiments.

The image processing apparatus 100 may express factors considered in rendering, such as lighting, material, and visibility information, using a spherical harmonics (SH) basis. In addition, visibility may be applied to dynamic geometry through computation based on screen space ambient occlusion, instead of pre-computation of the visibility information.

The image processing apparatus 100 may include a storage unit 110 and a rendering unit 120. Each of the above-described units may include at least one processing device. Further, the storage unit 110 may be a hard drive capable of storing data, however, the present disclosure is not limited thereto.

The storage unit 110 may store a lookup table (LUT) including information regarding an occlusion vector related to at least one point of a 3-dimensional (3D) object and SH coefficients.

The rendering unit 120 may determine a first SH coefficient corresponding to a first occlusion vector related to a first point of the 3D object using the LUT, and determine a pixel value of the first point using the first SH coefficient.

The rendering unit 120 may quickly derive the SH coefficient using the LUT, thereby performing real time rendering.

For example, the rendering unit 120 may compute the first occlusion vector by sampling an occlusion map related to the first point.

In this case, the rendering unit 120 may compute the first occlusion vector by computing occlusion angles related to directions in a number related to the sampling, with respect to the first point, using a depth image and a normal image related to the first point.

In addition, the rendering unit 120 may compute a second SH coefficient by projecting a lighting environment related to the first point to at least one SH basis, and determine a pixel value of the first point by performing dot product of the first SH coefficient and the second SH coefficient.

Figure 2:
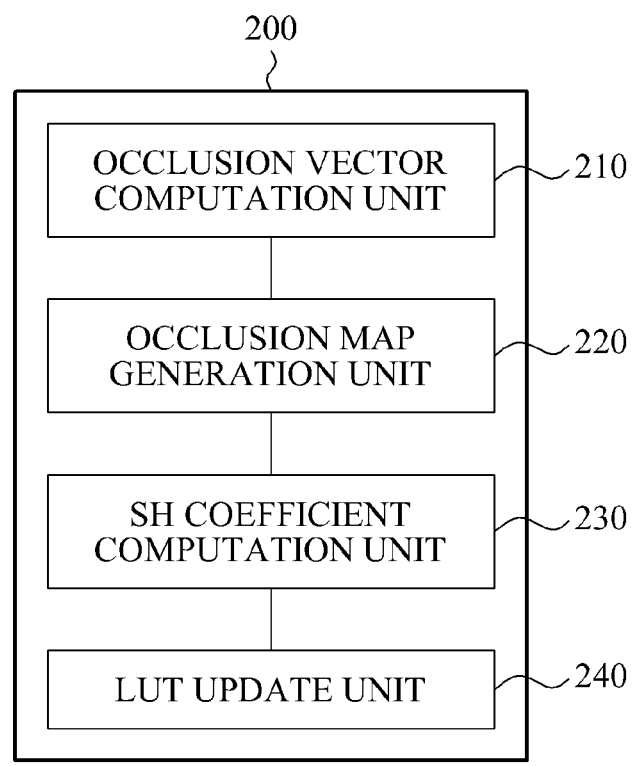
FIG. 2 illustrates a block diagram of an image processing apparatus, according to other example embodiments.

In another example embodiment, the image processing apparatus 100 may further include a computation unit 200 (as shown in FIG. 2, for example). The computation unit 200 may include at least one processing device.

The computation unit 200 may generate the LUT by performing pre-computation that projects the occlusion vector of the at least one point to the at least one SH basis.

A process of generating the LUT through the pre-computation will be described with reference to FIGS. 2 to 7.

FIG. 2 illustrates a block diagram of the computation unit 200 of the image processing apparatus 100, according to other example embodiments.

The computation unit 200 may include an occlusion vector computation unit 210, an occlusion map generation unit 220, an SH coefficient computation unit 230, and an LUT update unit 240.

The occlusion vector computation unit 210 may compute an occlusion vector of at least one point included in the 3D object, using a Z-buffer value (also referred to as a depth buffer) and a normal vector of the at least one point. For purpose of simplicity, a description of a z-buffer and a normal vector will be omitted.

The occlusion map generation unit 220 may generate an occlusion map of the at least one point, by reflecting a bidirectional reflectance distribution function (BRDF) related to at least one point.

The SH coefficient computation unit 230 may compute at least one SH coefficient corresponding to the at least one occlusion map, by projecting the occlusion map to at least one predetermined SH basis.

The LUT update unit 240 may update the LUT by reflecting information on corresponding relations between the at least one occlusion vector and the at least one SH coefficient to the LUT.

Figure 3:
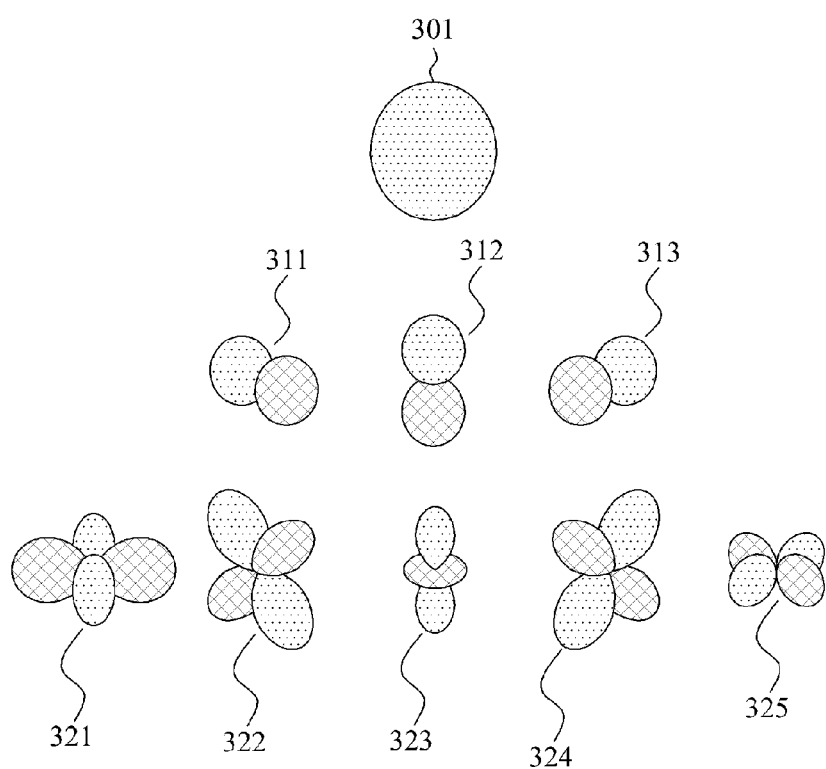
FIG. 3 illustrates a spherical harmonics (SH) basis, according to example embodiments.

FIG. 3 illustrates an SH basis according to example embodiments.

The SH may refer to a Fourier transform in a 1D circle and may constitute an orthonormal basis.

The SH may be expressed by the following Equation 1 to Equation 3.

$$P_\ell^{-m} = (-1)^m \frac{(\ell - m)!}{(\ell + m)!} P_\ell^m \quad \text{[Equation 1]}$$

$$K_\ell^m = \sqrt{\frac{(2\ell + 1)(\ell - |m|)!}{4\pi(\ell + |m|)!}} \quad \text{[Equation 2]}$$

$$y_\ell^m = \quad \text{[Equation 3]}$$

$$\begin{cases} \sqrt{2}\,\mathrm{Re}(Y_\ell^m) & m > 0 \\ \sqrt{2}\,\mathrm{Im}(Y_\ell^m) & m < 0 \\ Y_\ell^0 & m = 0 \end{cases} = \begin{cases} \sqrt{2}\,K_\ell^m \cos m\varphi P_\ell^m(\cos\theta) & m > 0 \\ \sqrt{2}\,K_\ell^m \sin|m|\varphi P_\ell^{|m|}(\cos\theta) & m < 0 \\ K_\ell^0 P_\ell^0(\cos\theta) & m = 0 \end{cases}$$

A Lambertian surface used for rendering may function as a low pass filter. That is, frequency-space analysis is applicable to rendering.

In diffuse surface rendering, for example, when 9 SH bases 301, 311, 312, 313, 321, 322, 323, 324, and 325 are used as shown in FIG. 3, an error rate of about 3% or less with respect to a ground truth may be achieved.

Considering this matter, quantity of computation and a bandwidth may be reduced by as much as thousands or tens of thousand times.

Figure 4:
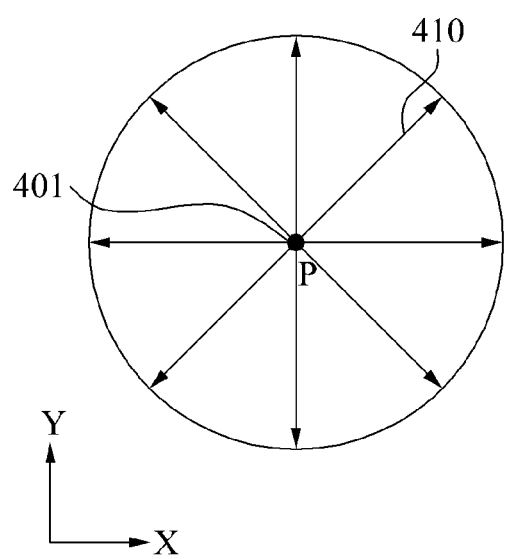
FIG. 4 illustrates a process of computing an occlusion vector with respect to a particular pixel, according to example embodiments.
Figure 5:
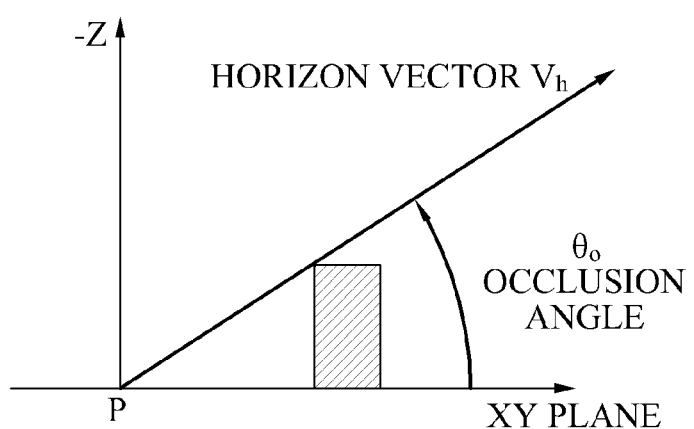
FIG. 5 illustrates an occlusion vector generation process of various cases from an occlusion angle shown in FIG. 4, according to example embodiments.

FIGS. 4 and 5 illustrate a computation process of an occlusion vector with respect to a particular pixel, according to example embodiments.

The image processing apparatus 100 may perform pre-computation with respect to all possible cases related to visibility, while considering ambient objects on a screen space.

Results of the pre-computation may be generated as the occlusion vectors corresponding to the respective cases, and stored as keys. Further, the pre-computation may be performed by the computation unit.

The occlusion vector may be computed using a Z-buffer value and a normal vector of at least one point. The occlusion vector may be defined as a direction vector with respect to a plurality of directions, such that the direction vector originates from the at least one point P 401, as shown in FIG. 4.

Referring to FIG. 4, a direction vector 410 with respect to 8 directions may be generated with respect to at least one point 401 of the object. The 8 directions described above are exemplary, and thus, the present disclosure is not limited to 8 directions.

An angle of the direction vector 410, that is, the occlusion angle, may be computed using a position of an occluder on the screen space.

For example, an angle between a center of the at least one point 401 of the object with respect to the Z-buffer, that is, a depth buffer, and an XY-plane of a horizon vector passing over an occluder located around may be defined as the occlusion angle (see FIG. 5, for example).

The occlusion vector may be determined to be an orderly arrangement of the occlusion angles with respect to the eight directions.

The occlusion angles computed in the process of FIG. 4 may be generated as the occlusion vector with respect to the various cases as shown in FIG. 5 through discretization.

That is, the occlusion angles may be discretized at every 10 degrees, thereby being determined as the occlusion vectors with respect to the respective cases. However, the present disclosure is not limited to the occlusion angles being discretized at every 10 degrees. That is, the occlusion angles may be discretized at other angle intervals.

Figure 6:
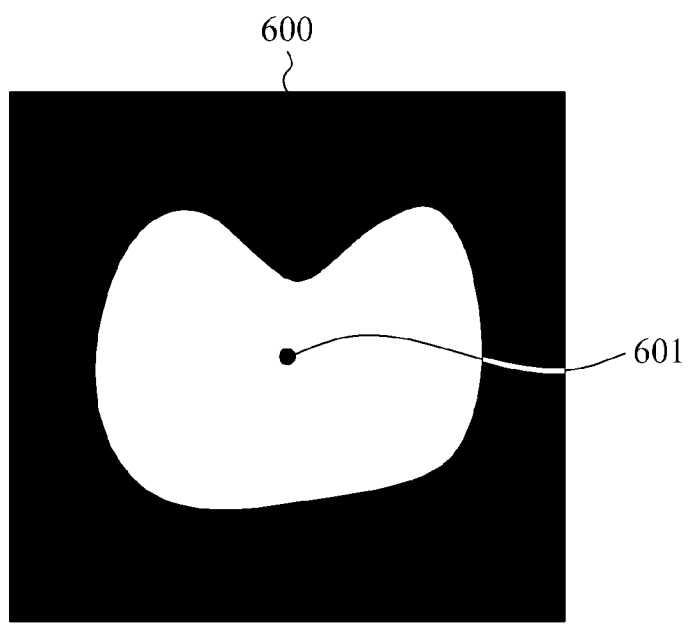
FIG. 6 illustrates an occlusion map generation process, according to example embodiments.

FIG. 6 illustrates an occlusion map generation process according to example embodiments.

The occlusion vectors computed in the process of FIGS. 4 and 5 may not be directly converted into the SH coefficients.

Therefore, to compute the SH coefficients with respect to the occlusion vectors, an occlusion map 600 may be generated first using the occlusion vectors.

The occlusion map 600 may be understood as a map obtained by interpolating angles between the occlusion vectors and rendering occlusion directions with respect to all directions.

In this case, the occlusion map 600 may be generated by reflecting a BRDF related to at least one point 601.

Figure 7:
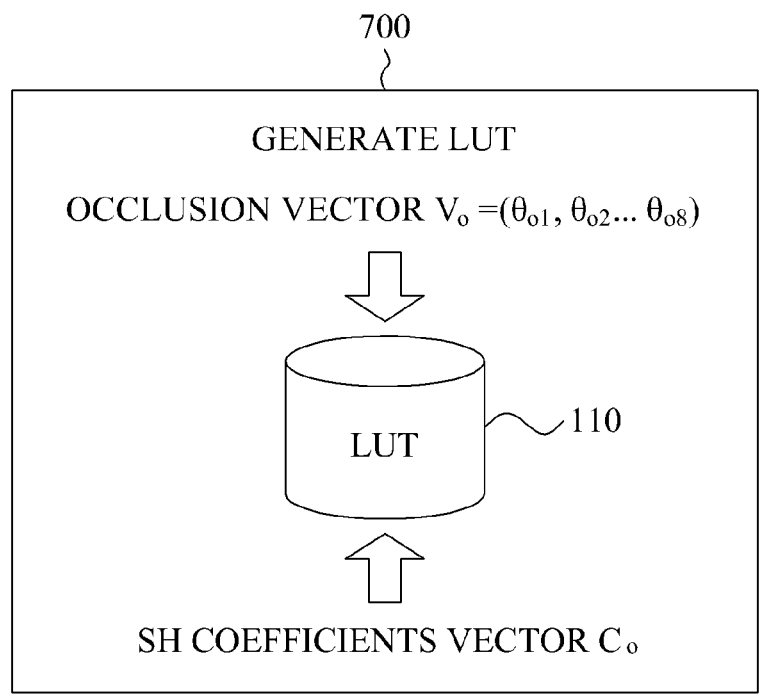
FIG. 7 illustrates a process of updating a lookup table (LUT) using the occlusion map of FIG. 6, according to example embodiments.

FIG. 7 illustrates a process of updating an LUT using the occlusion map 600 of FIG. 6, according to example embodiments. That is, the LUT stored in the storage unit 110 may be updated.

The occlusion map 600 generated in the process of FIG. 6 may be used to update the LUT that stores information on corresponding relationships between the occlusion vector related to at least one point of the 3D object and the SH coefficient.

The SH coefficient may be computed by projecting the occlusion map to at least one SH basis.

The LUT may be updated by reflecting the information on the corresponding relations between the occlusion vector and the SH coefficient related to the occlusion vector.

Figure 8:
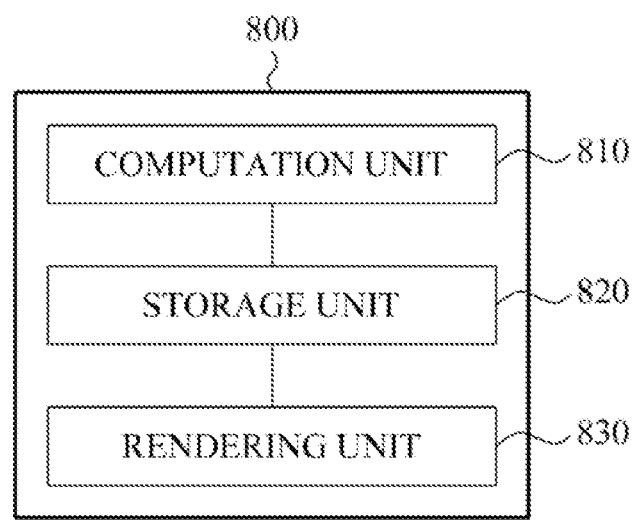
FIG. 8 illustrates a block diagram of an image processing apparatus, according to example embodiments.

FIG. 8 illustrates a block diagram of an image processing apparatus 800 according to other example embodiments.

The image processing apparatus 800 may include a computation unit 810, a storage unit 820, and a rendering unit 830. The computation unit 810 may or may not be the same as the computation unit 200 of FIG. 2. Further, the storage unit 820 and the rendering unit 830 may or may not be the same as the storage unit 110 and the rendering unit 120 of FIG. 1, respectively.

The computation unit 810 may generate an LUT through pre-computation that projects an occlusion vector of at least one point of a 3D object to at least one predetermined SH basis.

In this case, the computation unit 810 may compute the at least one occlusion vector using a Z-buffer value and a normal vector of the at least one point, and may compute SH coefficients by projecting an occlusion map generated by reflecting a BRDF related to the at least one point, to the at least one SH basis.

The storage unit 820 may store an LUT storing information on corresponding relationships between the occlusion vector related to the at least one point and the SH coefficients.

The rendering unit 830 may determine a first SH coefficient corresponding to a first occlusion vector related to a first point of the 3D object using the LUT and determine a pixel value of the first point using the first SH coefficient.

As such, the rendering unit 830 may quickly derive the SH coefficient using the LUT, thereby performing real time rendering.

For example, the rendering unit 830 may sample an occlusion map related to the first point, thereby computing the first occlusion vector.

In this case, the rendering unit 830 may compute the first occlusion vector by computing occlusion angles related to directions in a number related to the sampling, with respect to the first point, using a depth image and a normal image related to the first point.

In addition, the rendering unit 830 may compute a second SH coefficient by projecting a lighting environment related to the first point to at least one SH basis, and determine a pixel value of the first point by performing dot product of the first SH coefficient and the second SH coefficient.

Figure 9:
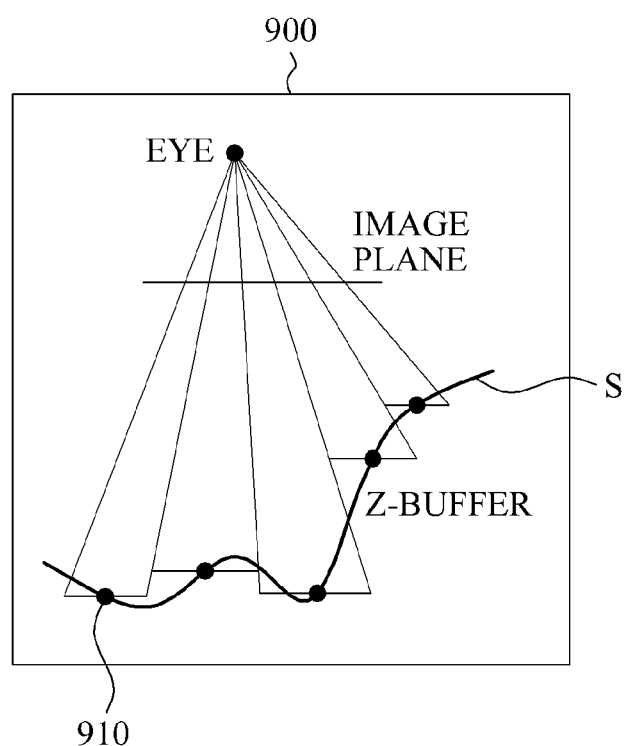
FIG. 9 illustrates a pre-computation process, according to example embodiments.

FIG. 9 illustrates a pre-computation process, according to example embodiments.

When a Z-buffer and a normal vector related to the 3D object are input, an occlusion vector related to the 3D object and a corresponding SH coefficient may be pre-computed by the computation unit.

The computation unit may compute the occlusion vector with respect to the at least one point 910, using the Z-buffer and the normal vector of the at least one point 910 of the 3D object.

In addition, the computation unit may generate an occlusion map by reflecting a BRDF related to the at least one point 910, and compute SH coefficients related to the occlusion vector by projecting the occlusion map to the at least one SH basis.

Information on corresponding relations between the occlusion vector the SH coefficients computed by the computation unit may be stored in the LUT of the storage unit.

Figure 10:
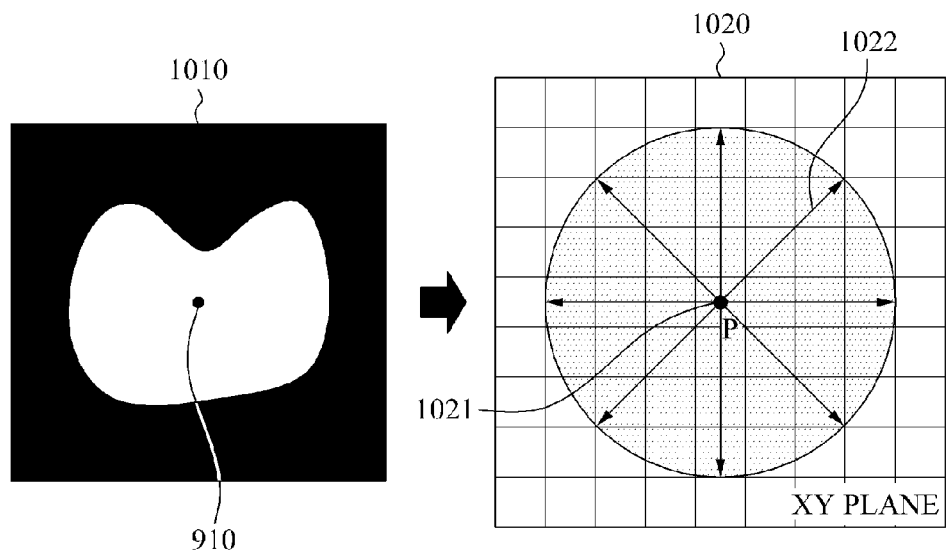
FIG. 10 illustrates a real time rendering process, according to example embodiments.
Figure 11:
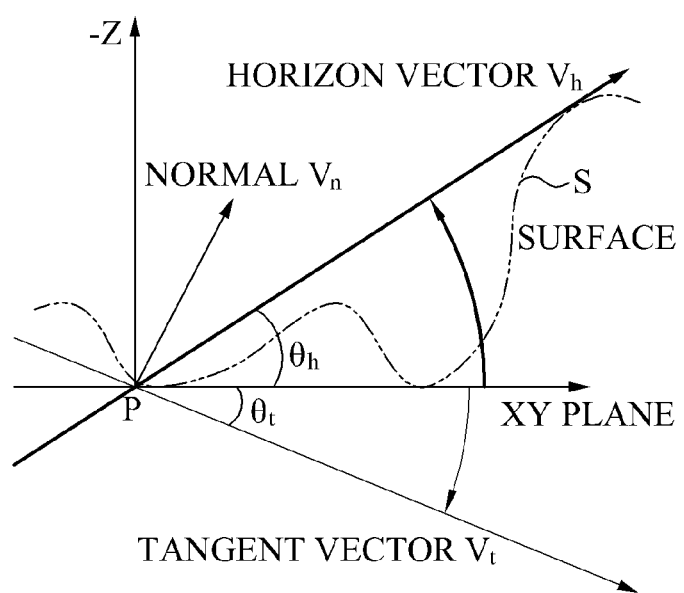
FIG. 11 illustrates a process of computing an occlusion vector from an occlusion angle shown in FIG. 10, according to example embodiments.

FIGS. 10 and 11 illustrate a real time rendering process, according to example embodiments.

The rendering unit may perform rendering using an occlusion map 1010 related to the first point 910 of the 3D object.

A color value of each pixel may be determined through dot product of a second SH coefficient considering a lighting environment and a first SH coefficient related to visibility information and a BRDF of a corresponding pixel.

Since SH with respect to the lighting environment is globally computed only once with respect to an entire scene, real time computation may be achieved efficiently.

However, since real time computation of the first SH coefficient related to the visibility and the BRDF is impossible, a result of pre-computation by the computation unit may be used.

The rendering unit may sample the occlusion map 1010 related to the first point 910 as shown in 1020 of FIG. 10, thereby computing a first occlusion vector with respect to the 3D object.

For example, the rendering unit may compute the first occlusion vector by generating and randomly sampling direction vectors 1022 with respect to eight directions with respect to a first point 1021, using a depth image and a normal image related to the first point 1021.

Occlusion angles related to the direction vectors 1022 may be computed as shown in FIG. 11.

Referring to FIG. 11, a tangent line of a provided surface S at point P may be a tangent vector. A vector tangential to a highest portion of the surface with respect to the tangent vector Vt may be a horizon vector Vh.

The occlusion angles may be obtained through dot product of the tangent vector and the horizontal vector.

The rendering unit may compute occlusion vectors from the occlusion angles and obtain a first SH coefficient related to the first points 910 and 1021 by referencing the LUT.

The rendering unit may compute a second SH coefficient by projecting a lighting environment related to the first points 910 and 1021 to at least one predetermined SH basis, and determine pixel values of the first points 910 and 1021 by performing dot product of the first SH coefficient and the second SH coefficient.

Figure 12:
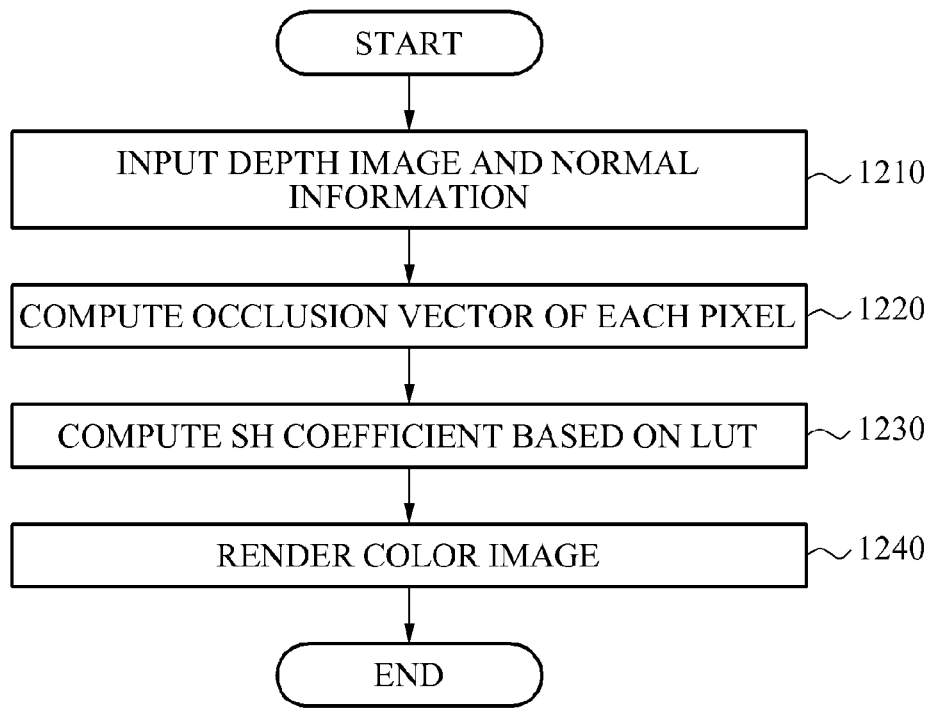
FIG. 12 illustrates a flowchart of an image processing method, according to example embodiments.

FIG. 12 illustrates a flowchart of an image processing method, according to example embodiments.

In operation 1210, a depth image and a normal image related to a first point to be rendered may be input.

In operation 1220, the rendering unit may compute a first occlusion vector related to the first point.

That is, in operation 1220, the rendering unit may generate an occlusion map using the depth image and the normal image related to the first point, and may compute the first occlusion vector by sampling the occlusion map.

In addition, in operation 1220, the sampling may refer to the computing of occlusion angles related to different directions in a number related to the sampling with respect to the first point, and determining of the occlusion angles as elements of the first occlusion vector.

In operation 1230, the rendering unit may determine a first SH coefficient corresponding to the first occlusion vector using an LUT.

In operation 1240, the rendering unit may render a pixel value of the first point using the first SH coefficient.

In another embodiment, the rendering unit may further compute a second SH coefficient by projecting a lighting environment related to the first point to at least one predetermined SH basis, and determine the pixel value of the first point by performing dot product of the first SH coefficient and the second SH coefficient.

According to some example embodiments, the image processing method may generate the LUT through pre-computation of a computation unit. Generation and update of the LUT may be performed as shown in FIG. 13.

Figure 13:
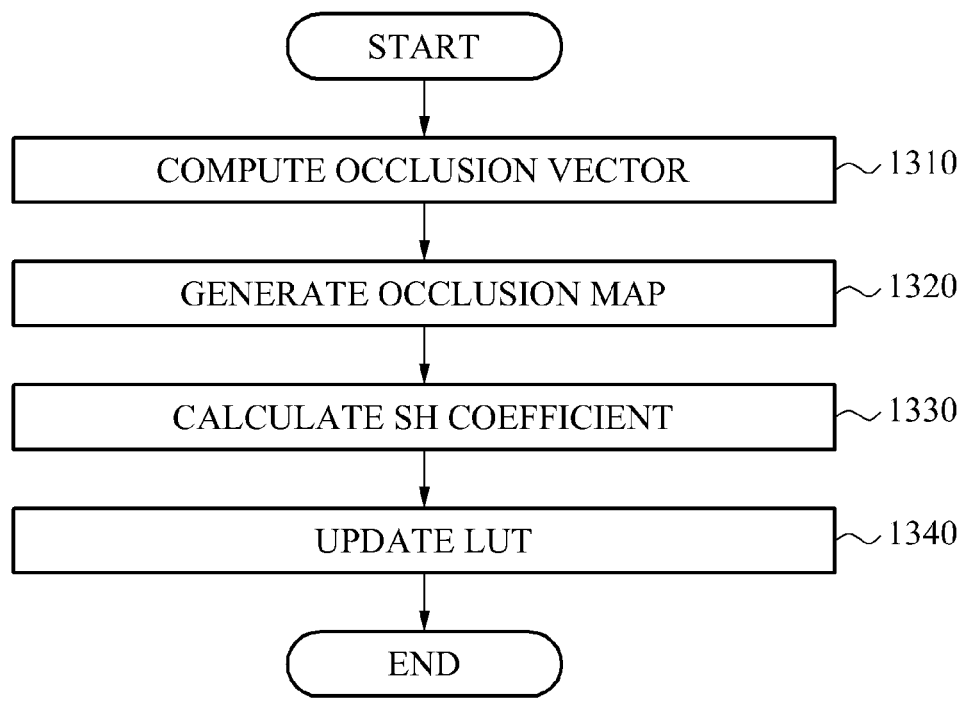
FIG. 13 illustrates a flowchart of an image processing method, according to other example embodiments.

FIG. 13 illustrates a flowchart of an image processing method according to other example embodiments.

In operation 1310, the occlusion vector computation unit may compute an occlusion vector of the at least one point included in the 3D object, using a Z-buffer value and a normal vector of the at least one point.

In operation 1320, the occlusion map generation unit may generate an occlusion map of the at least one point by reflecting a BRDF related to the at least one point.

In operation 1330, the SH coefficient computation unit may compute at least one SH coefficient corresponding to the at least one occlusion map, by projecting the occlusion map to at least one predetermined SH basis.

In operation 1340, the LUT update unit may update the LUT by reflecting information on corresponding relations between the at least one occlusion vector and the at least one SH coefficient to the LUT.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made while remaining within the scope of the present disclosure. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

Further, according to an aspect of the embodiments, any combinations of the described features, functions and/or operations can be provided.

Moreover, the various embodiments of the image processing apparatus discussed above may include at least one processor to execute at least one of the above-described units and methods.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing apparatus, comprising:
   a storage processor configured to store a lookup table (LUT) including information on corresponding relationships between an occlusion vector of at least one point of a 3-dimensional (3D) object and a spherical harmonics (SH) coefficient;
   a rendering processor configured to determine a first SH coefficient using the LUT and to determine a pixel value of a first point using the determined first SH coefficient; and
   a computation processor comprising;
     an LUT update processor configured to update the LUT based on the first SH coefficient; and
     an SH coefficient computation processor configured to compute the first SH coefficient by projecting an occlusion map to at least one SH basis.

2. The image processing apparatus of claim 1, wherein the first SH coefficient corresponds to a first occlusion vector related to the first point of the 3D object.

3. The image processing apparatus of claim 1, wherein the rendering processor is configured to compute a first occlusion vector by sampling the occlusion map related to the first point.

4. The image processing apparatus of claim 3, wherein the rendering processor is configured to compute the first occlusion vector by computing occlusion angles related to at least one direction in a number corresponding to the sampling of the occlusion map related to the first point, using a depth image and a normal image related to the first point.

5. The image processing apparatus of claim 1, wherein the computation unit processor is configured to generate the LUT by performing pre-computation that projects the occlusion vector of the at least one point to the at least one predetermined SH basis.

6. The image processing apparatus of claim 5, wherein the computation processor further comprises:
an occlusion vector computation processor configured to compute the occlusion vector of the at least one point using a Z-buffer value and a normal vector of the at least one point; and
an occlusion map generation processor configured to generate the occlusion map of the at least one point by reflecting a bidirectional reflectance distribution function (BRDF) related to the at least one point.

7. The image processing apparatus of claim 1, wherein the rendering processor computes a second SH coefficient by projecting a lighting environment related to the first point to at least one predetermined SH basis, and determines the pixel value of the first point by performing dot product of the first SH coefficient and the second SH coefficient.

8. The image processing apparatus of claim 1, wherein the LUT is updated by reflecting information on corresponding relationships between the occlusion vector and the first SH coefficient to the LUT.

9. An image processing apparatus, comprising:
at least one processor,
an occlusion vector computation processor using the at least one processor configured to compute an occlusion vector of at least one point included in a 3-dimensional (3D) object, using a Z-buffer value and a normal vector of the at least one point;
an occlusion map generation processor using the at least one processor configured to generate an occlusion map of the at least one point by reflecting a bidirectional reflectance distribution function (BRDF) related to the at least one point;
a spherical harmonics (SH) coefficient computation processor using the at least one processor configured to compute an SH coefficient corresponding to the at least one occlusion map by projecting the occlusion map to at least one predetermined SH basis; and
a lookup table (LUT) update processor using the at least one processor configured to update a LUT, storing information on relationships between occlusion vectors and SH coefficients, based on the SH coefficient.

10. The image processing apparatus of claim 9, wherein the LUT update processor updates the LUT by reflecting information on corresponding relations between the occlusion vector and the SH coefficient to the LUT.

11. An image processing method, comprising:
computing a first occlusion vector related to a first point to be rendered;
determining a first spherical harmonics (SH) coefficient corresponding to the first occlusion vector using a generated lookup table (LUT); and
rendering a pixel value of the first point using the first SH coefficient;
updating the LUT based on the first SH coefficient,
wherein the first SH coefficient corresponds to an occlusion map created by projecting the occlusion map to at least one predetermined SH basis.

12. The image processing method of claim 11, wherein the computing of the first occlusion vector comprises:

generating an occlusion map using a depth image and a normal image related to the first point;
computing the first occlusion vector by sampling the occlusion map.

13. The image processing method of claim 12, wherein the computing of the first occlusion vector comprises:
computing occlusion angles related to directions in a number related to the sampling with respect to the first point; and
determining of the occlusion angles as elements of the first occlusion vector.

14. The image processing method of claim 11, wherein the rendering comprises:
computing a second SH coefficient by projecting a lighting environment related to the first point to at least one predetermined SH basis, and determining the pixel value of the first point by performing dot product of the first SH coefficient and the second SH coefficient.

15. The image processing method of claim 11, further comprising:
generating the LUT by performing pre-computation that projects the occlusion vector of the at least one point including the first point to the at least one SH basis.

16. The image processing method of claim 15, wherein the generating of the LUT further comprises:
computing an occlusion vector of at least one point using a Z-buffer value and a normal vector of the at least one point; and
generating the occlusion map of the at least one point by reflecting a bidirectional reflectance distribution function (BRDF) related to the at least one point.

17. A non-transitory computer readable recording medium storing a program to cause a computer to implement the method of claim 11.

18. The image processing method of claim 11, wherein the LUT is updated by reflecting information on corresponding relations between the first occlusion vector and the first SH coefficient to the LUT.

19. An image processing method, comprising:
computing an occlusion vector of at least one point included in a 3-dimensional (3D) object, using a Z-buffer value and a normal vector of the at least one point;
generating an occlusion map of the at least one point by reflecting a bidirectional reflectance distribution function (BRDF) related to the at least one point
computing a spherical harmonics (SH) coefficient corresponding to the at least one occlusion map by projecting the occlusion map to at least one predetermined SH basis; and
updating a LUT, storing information on relationships between occlusion vectors and SH coefficients, based on the SH coefficient.

20. The image processing method of claim 19, further comprising updating the LUT by reflecting information on corresponding relations between the occlusion vector and the SH coefficient to the LUT.

21. An image processing apparatus, comprising:
a computation processor configured to generate a lookup table (LUT) by computing at least one occlusion vector and spherical harmonics (SH) coefficients;
a storage processor configured to store the LUT including information relating to the at least one occlusion vector and the SH coefficients;
a rendering processor configured to derive a first SH coefficient using the LUT, thereby performing real-time rendering; and an updating processor configured to update the LUT based on the first SH coefficient, wherein the first SH coefficient corresponds to an occlusion map created by projecting the occlusion map to at least one predetermined SH basis.

22. The image processing apparatus of claim 21, wherein the computation processor is configured to compute the at least one occlusion vector using a Z-buffer value and a normal vector of at least one point of a 3D object, and compute the SH coefficients by projecting an occlusion map generated by reflecting a bidirectional reflectance distribution function (BRDF) related to the at least one point, to at least one SH basis.

23. The image processing apparatus of claim 21, wherein the rendering processor is configured to determine the first SH coefficient corresponding to a first occlusion vector related to a first point of a 3D object using the LUT, and determine a pixel value of the first point using the first SH coefficient.

\* \* \* \* \*